July 25, 1967   D. R. PARRISH   3,332,480

RECOVERY OF HYDROCARBONS BY THERMAL METHODS

Filed March 4, 1965

IDLE DURING FIRST STAGE

ACTIVE DURING FIRST STAGE

IDLE DURING FIRST STAGE

ACTIVE DURING FIRST STAGE

● = PRODUCING WELL
○ = INJECTION WELL

DAVID R. PARRISH
INVENTOR.

BY Arthur McIlroy

ATTORNEY.

United States Patent Office 3,332,480
Patented July 25, 1967

3,332,480
RECOVERY OF HYDROCARBONS BY THERMAL
METHODS
David R. Parrish, Tulsa, Okla., assignor to Pan American
Petroleum Corporation, Tulsa, Okla., a corporation of
Delaware
Filed Mar. 4, 1965, Ser. No. 437,060
8 Claims. (Cl. 166—2)

ABSTRACT OF THE DISCLOSURE

In thermal recovery operations, it is difficult to maintain a sufficiently high air flow rate to keep combustion going; also, during steam injection, low injection rates cause excessive heat losses. The main problem is being able to remove the oil fast enough so that air can be injected fast enough to sustain combustion. Since air flows much more readily than the fluids can be produced, the solution is to have a high ratio of producing wells to injection wells. Nine spots are better for this reason than five spots. Another way of obtaining a higher ratio of producing wells to injection wells is to operate the various five- or nine-spot patterns in a checker-board pattern. After the first patterns are burned out, they can be filled with water or gas to prevent re-entry of oil into the burned out patterns. Then the other set of patterns could be operated.

The present invention relates to the recovery of hydrocarbons from underground deposits thereof by fluid injection methods. More particularly, it is concerned with a concept by which such hydrocarbons are produced more efficiently, owing to a higher ratio of producing wells to injection wells whereby it is possible to process at a faster rate a specific reservoir volume encompassed by a given well pattern than has been possible to accomplish in the past.

It should be understood that my invention, for example, does not necessarily embody any fundamental change in known underground combustion or steam injection techniques, but is concerned with a novel procedure or sequence in which such techniques are used to secure more efficient oil recovery. Briefly, this is accomplished by employing a high ratio of production to injection wells—a circumstance created by carrying out such techniques, i. e., combustion or steam injection, in stages during which not all of the well patterns in a field are operated. Thermal treatment is generally conducted on one group of wells until recovery of desired products is considered uneconomical, and then the same sequence of steps is applied to different groups of well patterns. This procedure, of course, may be conducted until the field is depleted.

Fluid flow rate within a hydrocarbon reservoir is a very important factor in thermal recovery operations. Accordingly, during forward combustion, a high air flow rate or air flux must be maintained or the temperature will fall to a level at which combustion cannot be supported. In steam injection operations, low injection rates result in excessive heat losses. Thus, fluid flow rates affect the operability or efficiency of all thermal recovery procedures.

Again referring to forward combustion, it is common knowledge that—owing to the nature of radial flow—the formation in the vicinity of the producing wells is the "bottleneck." Thus, in this process the injected fluid, air, has a low viscosity, i.e., about $\frac{1}{50}$ centipoise. The air enters the formation easily where the latter has been burned clean. Accordingly, a fluid of low viscosity is introduced into the formation where the relative permeability characteristics are favorable. At the producing wells, however, fluid flow is more difficult since viscous oil, water, and gas have to be produced where the relative permeability is most unfavorable. Thus, it is seen that the rate a fluid is injected into a reservoir—once the system has reached equilibrium—is controlled by the producing wells.

Accordingly, it is an object of my invention to provide a thermal recovery method requiring a minimum number of wells to produce a given quantity of hydrocarbons from a field. It is another object of my invention to provide a method for recovering hydrocarbons by underground combustion wherein a larger volume of a hydrocarbon-containing reservoir can be worked at a given air flux for any series of well patterns that has been true in the past. It is still another object of my invention to provide a method by which a larger volume of a hydrocarbon-containing reservoir can be worked and hydrocarbons produced therefrom, by means of steam injection, for any series of well patterns than has been possible in the past. It is a further object of my invention to provide a method by which oil can be removed from a reservoir thereof by thermal means at a rate fast enough to permit injection of air at a sufficiently rapid rate to sustain combustion and, where steam is used, injection should be at a sufficiently rapid rate to avoid excessive heat losses.

In the accompanying drawings:

FIGURE 5 represents a field of nine-spots in which every other pattern is active at a given time while

Figure 1:
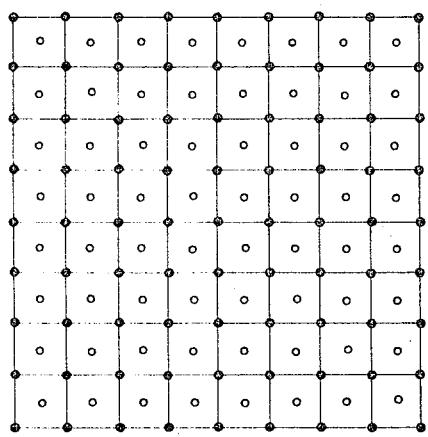
FIGURE 1 represents an oil field developed on a regular pattern wherein, after depletion by primary methods, five-spot patterns are formed by drilling a central injection well within each of the four-well patterns.

Referring again to FIGURE 1, we see that the ratio of production to injection wells is 1:1. When all these five-spot patterns are operated simultaneously, each corner production well only produces one fourth of the volume of fluid injected into that particular pattern via the central injection well of such pattern. This is true because the corner production well of said particular pattern not only takes fluid from the central injection well of said particular pattern, but receives an equal volume of fluid from each injection well in each of the three adjacent active well patterns. While air or steam injection in underground combustion or steam flooding, respectively, is easily effected and, accordingly, it is possible initially to inject much larger volumes of these fluids into the reservoir than can be withdrawn through the production wells, ultimately the fluid injection rate will be limited to that rate at which fluids are produced. Hence, we see that in a case such as shown in FIGURE 1, the stabilized air or steam injection rate is small, i.e., the rate at which fluid is injected into the reservoir via an injection well of a given pattern, depends on the fluid withdrawal rate of the producing or perimeter wells in said pattern.

Figure 2:
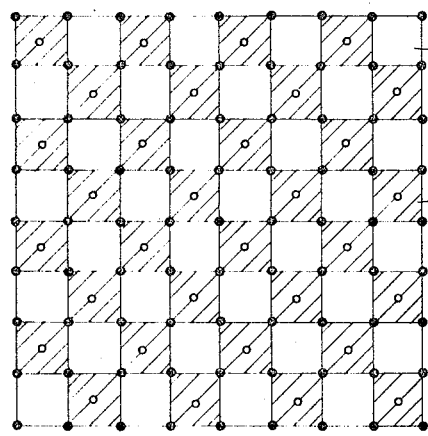
FIGURE 2 represents a field in which every other five-spot is active at a given time.

In FIGURE 2, a scheme is shown in which only every other one of a series of five-spots is actively worked at a given time. In this way it is seen that in each corner producing well of a given well pattern one-half of the produced fluids are derived from the injection well of said pattern and the other half comes from the injection well in the adjacent active well pattern. This means that for any given active well pattern the ratio of producing to injection wells is 2:1 instead of 1:1, as was true in the system shown in FIGURE 1.

Figure 3:
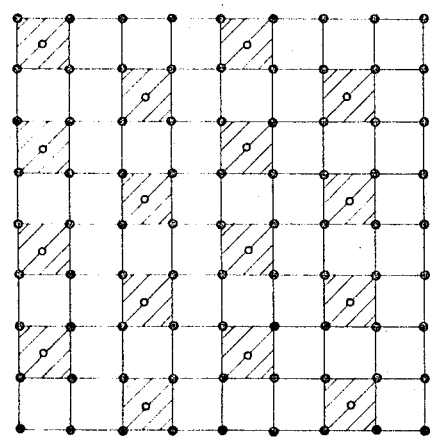
FIGURE 3 illustrates a system in which each of the active well patterns at any given time of operation is surrounded by inactive patterns.

With well patterns as shown in FIGURE 3, by operating in four stages in such a way that at any time no active well pattern is in contact with another, it is seen that the ratio of producing to injection wells is 4:1. Thus, in a field of a given area and employing a combustion or steam injection process essentially the same recovery is obtained in FIGURE 3 as in FIGURES 1 and 2, but the fluid injection rate is four times faster than in the case of FIGURE 1, and twice as fast as with the system used in FIGURE 2.

Figure 4:
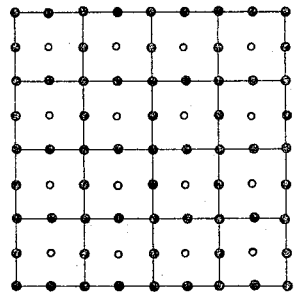
FIGURE 4 illustrates a field laid out in a series of typical nine-spots, each pattern of the system being active at the same time, i.e., a conventional nine-spot system.
Figure 5:
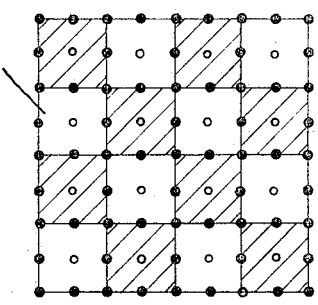
Figure 6:
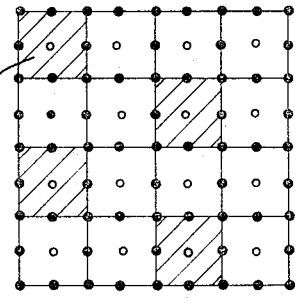
FIGURE 6 depicts a series of nine-spots in which each active nine-spot pattern is surrounded by inactive nine-spot patterns.

FIGURE 4 is a conventional nine-spot system while FIGURES 5 and 6 are variations of FIGURE 4, embodying the principles of my invention. As was seen in the above discussion relating to FIGURES 2 and 3, FIGURES 5 and 6 demonstrate different ways in which the ratio of producing wells to injection wells can be increased to secure the advantage of more rapid fluid and heat flow through the reservoir and, in the case where well patterns are to be formed in a specific field for either combustion or steam injection purposes, considerable savings can be realized by the use of fewer wells in accordance with my invention. Thus, the infill drilling that would be required by prior methods to sustain the proper air flux or heat flow, in the case of steam injection, is eliminated by the use of my invention.

When the combustion or steam injection operation is completed in the shaded areas shown in the drawing, fluid injection is discontinued and said areas filled with water. Or, if desired, gas injection may be continued at a low rate, e.g., about one tenth that used in the actual air or steam injection operation, in order to prevent oil from flowing back into the worked out areas during subsequent operations. Next, the process is repeated by carrying out the fluid injection step in groups of unshaded well patterns arranged in the same way as those originally operated, and oil recovered in the same fashion from the producing (perimeter) wells of the active patterns in this second stage of operation. Thus, in the procedure just described, while over-all production rate and injection rate remain substantially constant, the air flux—in the case of combustion—for any pattern is double in FIGURE 2 that obtainable by the procedure used in FIGURE 1. Otherwise stated, for a given air flux the volume of reservoir that can be subjected to combustion is four times that possible by the scheme used in FIGURE 1. In the case of steam injection, heat losses, employing the method used in FIGURE 1, would normally be twice those experienced when following the procedure used in conjunction with FIGURE 2 and four times that encountered in the method illustrated in FIGURE 3, as described above. When operating a steam injection process in accordance with my invention, it will be observed that where the ratio of producing to injection wells is higher, the heat loss is lower because less time is required to deplete a given reservoir volume.

The foregoing description, in general, assumes that the wells shown in the various patterns discussed are already in existence. However, the principle of my invention is equally applicable where one chooses to go into a new area such as, for example, where known heavy or viscous oil or tar sand deposits are located. To utilize my invention under such circumstances, the patterns are formed by drilling wells in such a way that in any active well pattern each corner well therein is in contact with a maximum of one other active well pattern, i.e., as illustrated in FIGURE 2. On the other hand, each active well pattern may be completely surrounded by inactive well patterns, as shown in FIGURE 3. Generally, formation of a series of well patterns ultimately the same as that illustrated in FIGURE 3, is usually preferred.

The means by which underground combustion and steam injection processes are initiated and maintained are well-known to the art. I would say, in general, that the minimum formation temperature at which underground combustion can be initiated or steam injection effected is about 300° F. Preferably, in the case of combustion, such a process is generally initiated at temperatures ranging from about 500° to about 800° F.

While the description of my invention has been restricted primarily to recovery of petroleum by steam injection and combustion methods, it should be understood that it is equally applicable to any type of rate sensitive oil recovery process that might be employed in obtaining valuable products from coal, shale deposits, hydrocarbon reservoirs, and the like, through in-place treatment thereof with fluids such as air, steam, etc. Also, it will be apparent to those skilled in the art that although I have referred only to forward combustion in describing this particular aspect of my invention, it applies, likewise, to the technique now known as reverse combustion.

Although the foregoing description has been directed primarily to thermal recovery methods, the process of my invention is applicable to any fluid injection operation in which the mobility of the injected fluid is greater than the produced fluid or fluids. Thus, miscible fluid drive, gas drive and most waterflooding operations, in addition to steam injection and combustion, come clearly within the concept of my invention.

The term "carbonaceous," as used herein, is intended to refer to either free or combined carbon.

I claim:

1. In a method for recovering oil from an oil-bearing reservoir having a plurality of wells extending thereinto and forming a plurality of similar well patterns therein, some of which are producing oil and some of which are idle, each of said patterns having a central well, the improvement which comprises injecting a driving fluid having a mobility greater than the recovered oil into the central well in each of a plurality of producing well patterns and then into said reservoir, each of the perimeter wells in said producing patterns simultaneously serving as a perimeter well for not more than one other producing well pattern, recovering oil from said perimeter wells, thereafter discontinuing injection of said fluid via the central well of each of said producing well patterns, injecting a driving fluid having a mobility greater than the recovered oil into the central well of each of the previously idle well patterns and then into said reservoir, each of the perimeter wells in the last-mentioned well patterns simultaneously serving as a perimeter well for not more than one other of said last-mentioned well patterns, and recovering oil from the perimeter wells in said last-mentioned well pattern.

2. In a method for recovering valuable products from a carbonaceous underground deposit by thermal methods, wherein the temperature of said deposit is at least about 300° F., said deposit having a plurality of wells extending thereinto and forming a plurality of similar well patterns therein, some of which are producing said products and some of which are idle, each of said patterns having a central well, the improvement which comprises injecting a fluid selected from the group consisting of steam and an oxygen-containing gas into the central well in each of a plurality of producing well patterns and then into said reservoir, each of the perimeter wells in said producing patterns simultaneously serving as a well for not more than one other producing well pattern, recovering said products from said perimeter wells, thereafter discontinuing injection of said fluid via the central well of each of said producing well patterns, injecting said fluid into the central well of each of the previously idle well patterns and then into said reservoir, each of the perimeter wells in the last mentioned well patterns simultaneously serving as a perimeter well for not more than one other producing well pattern, and recovering said products from the perimeter wells in said last mentioned well pattern.

3. The method of claim 2 in which the fluid injected is steam.

4. The method of claim 2 in which the fluid injected is an oxygen-containing gas.

5. The method of claim 2 in which said carbonaceous deposit is a hydrocarbon reservoir.

6. The method of claim 5 in which the fluid injected is steam.

7. The method of claim 5 in which the fluid injected is an oxygen-containing gas.

8. In a method for recovering oil from an oil-bearing reservoir having a plurality of wells extending thereinto and forming a plurality of similar well patterns therein, some of which are producing oil and some of which are idle, each of said patterns having a central well, the improvement which comprises injecting a driving fluid having a mobility greater than the recovered oil into the central well in each of a plurality of producing well patterns and then into said reservoir, each of the perimeter wells in said producing patterns simultaneously serving as a perimeter well for not more than one other producing well pattern, thereafter at least reducing the flow of said driving fluid into the aforesaid central injection well of each of said producing well patterns to a rate just sufficient to prevent oil from flowing back into the worked out areas in the first mentioned of said producing well patterns during subsequent operations, injecting a driving fluid having a mobility greater than the recovered oil into the central well of each of the previously idle well patterns and then into said reservoir, each of the perimeter wells in the last-mentioned well patterns simultaneously serving as a perimeter well for not more than one other of said last-mentioned well pattern, and recovering oil from the perimeter wells in said last-mentioned well pattern.

References Cited

UNITED STATES PATENTS

| | | | |
|---|---|---|---|
| 3,113,616 | 12/1963 | Dew et al. | 166—9 |
| 3,120,870 | 2/1964 | Santourian | 166—9 |
| 3,126,953 | 3/1964 | Nelson et al. | 166—11 |
| 3,253,652 | 5/1966 | Connally et al. | 166—11 X |

CHARLES E. O'CONNELL, *Primary Examiner.*

S. J. NOVOSAD, *Examiner.*